United States Patent [19] [11] Patent Number: 5,024,882
Matucha et al. [45] Date of Patent: Jun. 18, 1991

[54] MATERIAL FOR USE IN COMPOSITE SLIDING SURFACE BEARINGS AND PROCESS OF MANUFACTURING THE MATERIAL

[75] Inventors: Karl-Heinz Matucha, Kelkheim; Thomas Steffens, Offenbach; Hans-Paul Baureis, Dielheim-Horrenberg; Wolfgang Bickle, Reilingen; Jürgen Braus, Walldorf, all of Fed. Rep. of Germany

[73] Assignee: Kolbenschmidt Aktiengesellschaft, Neckarsulm, Fed. Rep. of Germany

[21] Appl. No.: 346,059

[22] Filed: May 2, 1989

[30] Foreign Application Priority Data

May 5, 1988 [DE] Fed. Rep. of Germany ....... 3815264

[51] Int. Cl.⁵ .......................... B32B 5/16; B32B 15/08
[52] U.S. Cl. .................................... 428/323; 428/327; 428/328; 428/332; 428/335; 428/421; 428/422; 428/463
[58] Field of Search ............... 428/463, 421, 422, 323, 428/327, 328, 335, 332; 252/12

[56] References Cited
U.S. PATENT DOCUMENTS 4,309,474 1/1982 Hodes et al. .................. 428/422 X
4,394,275 7/1983 Bickle et al. ......................... 252/12

Primary Examiner—Thomas J. Herbert
Attorney, Agent, or Firm—Sprung Horn Kramer & Woods

[57] ABSTRACT

A material for composite sliding surface bearings having a plastic sliding layer comprises a metallic backing layer and a sliding layer that is joined to the backing layer and consists of a matrix-forming fluorine-containing polymer, in which a metal powder having a high affinity to fluorine is finely dispersed. In order to increase the life, a fluorine-containing polymer is provided, which in an X-ray diffractogram prepared by CuKα-radiation has a sharp intensity peak at a double Bragg angle of $2\theta = 18.07 \pm 0.03°$ and has a melting range of 320° to 350° C. and contains metal fluoride and metal oxyfluoride.

11 Claims, 2 Drawing Sheets

MATERIAL FOR USE IN COMPOSITE SLIDING SURFACE BEARINGS AND PROCESS OF MANUFACTURING THE MATERIAL

BACKGROUND OF THE INVENTION

This invention relates to a material for use in composite sliding surface bearings having a plastic sliding layer, which material comprises a metallic backing layer preferably of steel, bronze or a high-strength aluminum alloy, and a sliding layer, which is bonded to the backing layer and has a thickness of 30 to 500 μm, preferably 50 to 250 μm, and consists of a matrix-forming fluorine-containing polymer that contains a fine dispersion of 5 to 50% by weight, preferably 30 to 40% by weight, metal powder having a high affinity to fluorine and a particle size of $\leq 40$ μm.

European Patent Specification 0 044 577 and German Patent Specification 29 28 081 disclose a material for composite sliding surface bearings having a plastic sliding layer, which material comprises a metallic backing layer, preferably a backing layer of steel, and on said backing layer has a sliding layer having a thickness of 30 to 500 μm and consisting of matrix-forming fluorine-containing polymer, i.e., polyvinylidene fluoride (PVDF) with 5 to 50% by volume lead particles having a particle size of 50 μm. Said sliding layer may contain substances which improve the sliding behavior, such as PTFE, MoS$_2$, graphite, as finely dispersed inclusions. The plastic sliding layer has desirably been applied to a porous rough layer which has been sinterbonded or sprayed onto the backing layer and has a thickness of 250 to 350 μm and consists of a metallic material which has good sliding properties, preferably bronze, and the voids of the rough layer are filled with the plastic of the sliding layer.

The bearing bodies made of that composite bearing material have found a wide field of application but undesirably cannot withstand high mechanical loads, such as occur, e.g., in bearings of hydraulic motors. Their life is intolerably short so that the life of the machine is limited. This results in the requirement for composite bearing materials which are capable of carrying comparatively higher mechanical loads and have a higher wear resistance and the lowest possible friction.

SUMMARY OF THE INVENTION

For this reason it is an object of the present invention to provide a composite bearing material which is superior to the composite bearing material described first hereinbefore as regards wear rate and life.

That object is accomplished in that the fluorine-containing polymer has in an X-ray diffractogram prepared by CuKα-radiation a sharp intensity peak at a double Bragg angle of $2\theta = 18.07° \pm 0.03°$ and has a melting range of 320° to 350° C. and contains 5 to 30% by weight, preferably 15 to 25% by weight, metal fluoride and 0.5 to 5.0% by weight, preferably 1.0 to 3.0% by weight, metal oxyfluoride.

For the present purpose, metal powders having a particularly high affinity to fluorine particularly consist of lead, tin, zinc, indium, thallium, cadmium, bismuth, barium, copper, silver or tan alloy thereof, individually or in combination, inclusive of lead- and tin-base bearing metals.

The composite bearing material composed in accordance with the invention distinguishes by having comparatively low rear rates and a high fatigue limit so that a satisfactory function of the bearing bodies made from the material will be ensured even after very long running times. In order to improve the sliding properties and the stability, the matrix may contain 1 to 20% by weight, preferably 5 to 15% by weight, finely dispersed powder particles consisting of PTFE, MoS$_2$, graphite, ZnS, BaSO$_4$, and stearates, individually or in combination, and said powder particles in adaptation to the metal powder particles suitably have a particle size of $\leq 40$ μm.

In a preferred embodiment of the composite bearing material in accordance with the invention, the matrix contains 15 to 25% by weight lead fluoride, 1 to 3% by weight lead oxyfluoride and 30 to 40% by weight lead and optionally 5 to 15% by weight PTFE.

In a preferred embodiment, the matrix contains 59% by weight fluorine-containing polymer, 8% by weight lead, 24% by weight PbF$_2$, 1% by weight PbOF$_2$, and 8% by weight PTFE.

In a second preferred embodiment, the matrix consists of 43% by weight fluorine-containing polymer, 18% by weight PTFE, 15% by weight PbF$_2$, 4% by weight PbOF$_2$ and 20% by weight lead.

In a further embodiment the matrix consists of 53% by weight fluorine-containing polymer, 8% by weight PTFE, 15% by weight PbF$_2$, 4% by weight PbOF$_2$ and 20% by weight lead.

The matrix composed in accordance with the invention may be directly bonded to the mechanically or chemically roughened surface of the metallic backing layer. In another embodiment the plastic sliding layer is joined to the backing layer via a porous interlayer, which has been sinter-bonded or sprayed onto the backing layer and consists of a metallic bearing material, preferably of bronze, and the sliding layer fills the pores and constitutes a covering layer.

In the process of manufacturing the composite bearing material, a mixture of 30 to 80% by weight of the fluorine-containing polymer and 5 to 50% by weight of a metal powder having a high affinity to fluorine is applied to the metallic backing layer and is rolled onto said backing layer and is heated to a temperature in excess of 330° C., preferably of 345° to 400° C. and held at said temperature for 5 to 60 minutes, preferably 10 to 30 minutes, and is then continuously cooled to 100° C. during 0.5 to 10 minutes, preferably 1 to 4 minutes.

The manufacture of the composite bearing material may be carried out continuously by a continuous coating of a striplike backing layer, or discontinuously in that striplike sections are individually coated.

According to a special process feature, the cooling to temperature of about 180° C. is succeeded by a continuous cooling to a temperature of 120° to 115° C. at a rate of about 50° C./minute.

The invention will be explained more in detail hereinafter with reference to an example and to drawings, in which

DETAILED DESCRIPTION OF THE INVENTION

Figure 1:
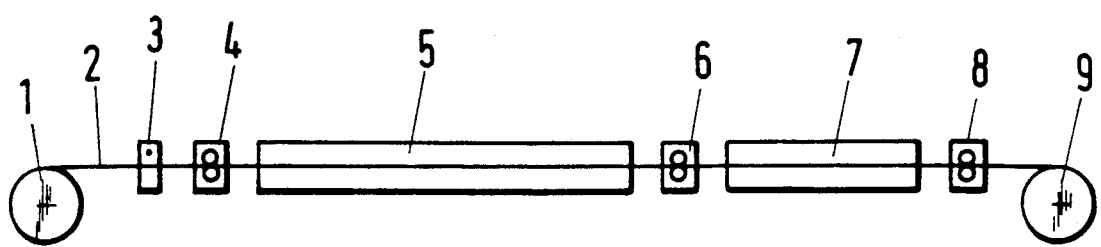
FIG. 1 is a diagrammatic representation of the apparatus for carrying out the process of manufacturing the composite bearing material.
Figure 2:
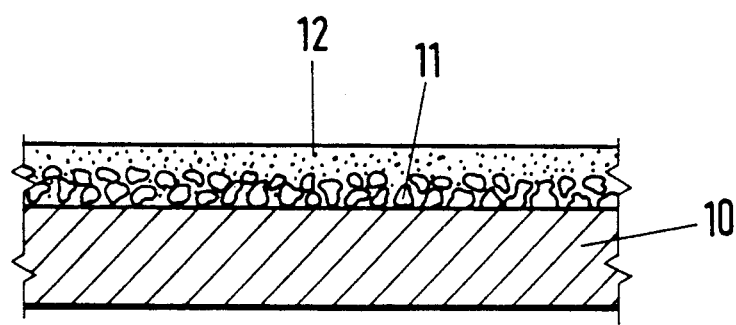
FIG. 2 is a sectional view showing the composite bearing material.

The strip 2 has been wound up on the reel 1 and consists of a steel strip 10, which constitutes a backing layer, and a porous sintered rough primer 11 of lead bronze. The strip 2 is continuously unwound from the reel 1 and on the side provided with the rough primer is uniformly coated with a powder mixture consisting that is supplied from a bin 3, provided with a stirrer, and consists of 60% by weight polyvinylidene fluoride (PVDF), 30 by weight lead and 10% by weight polytetrafluoroethylene (PTFE). When the strip 2 has passed through the rolling mill stand 4, in which the open pores of the rough primer 11 have been filled with the powder mixture in such a manner that there is a sliding layer 12 over the peaks of the rough primer, the coated strip 2 is passed through the continuous furnace 5 and is heated at 345° C. for 15 minutes. As a result, the PVDF is melted and transformed into a fluorine-containing polymer, in which 12% by weight lead, 10% by weight PTFE, 20% by weight lead fluoride and 2.5% by weight lead oxyfluoride are embedded and which in an X-ray diffractogram produced by means of CuKα-radiation has an intensity peak at a double Bragg angle of $2\theta = 18.07° + 0.03°$ and has a melting range of 320° to 350° C. When the strip has left the furnace 5, the fluorine-containing polymer is recompacted and smoothened in the rolling mill stand 6 and is subsequently continuously cooled in the continuous furnace 7 to a temperature of about 100° C. within 5 minutes. In the following rolling mill stand 8, the composite bearing material which has been made is sized in the following rolling mill stand 8 and is finally wound up on the reel 9. Sliding surface bearing elements, particularly bearing bushings, bearing shells, flanged bushings and stop disks, can easily be made from the striplike composite bearing material without a need for any aftertreatment or subsequent machining.

In order to show the tribological behavior of the composite bearing material in accordance with the invention, a comparison experiment will now be described, in which a bearing bushing made of a composite bearing material that had been made by the process steps described hereinbefore was compared in respect of friction torque and wear with a bearing bushing that had been made from a composite bearing material in accordance with the prior art apparent from European patent specification No. 0 044 577 and consisted of a backing layer of steel, a porous bronze layer that was sinter-bonded to the backing layer and a sliding layer, which filled the open pores of the bronze layer and covered the peaks thereof and consisted of a sintered mixture of 50% by weight PVDF, 40% by weight lead and 10% by weight PTFE.

The friction torque and the wear were measured by means of a testing machine, in which a bearing bushing to be tested, which was 21 mm in diameter and had dimensions of 22 mm $\times$ 15 mm, was carried with a clearance of 0.03 mm by a journal that consisted of Type C35 soft steel and had a surface roughness of $R_A = 0.2$ μm and was rotated at a sliding velocity of 0.3 m/second. The bearing bushing to be tested had been pressed into a bearing body that constituted a pendulum and was under a specific load of 3.3 N/mm². The friction torque was determined from the excursion imparted to the pendulumlike bearing body in response to the rotation of the bearing bushing to be tested. The wear was determined after a sliding movement of 8, 16, 32 and 48 km.

Figure 3:
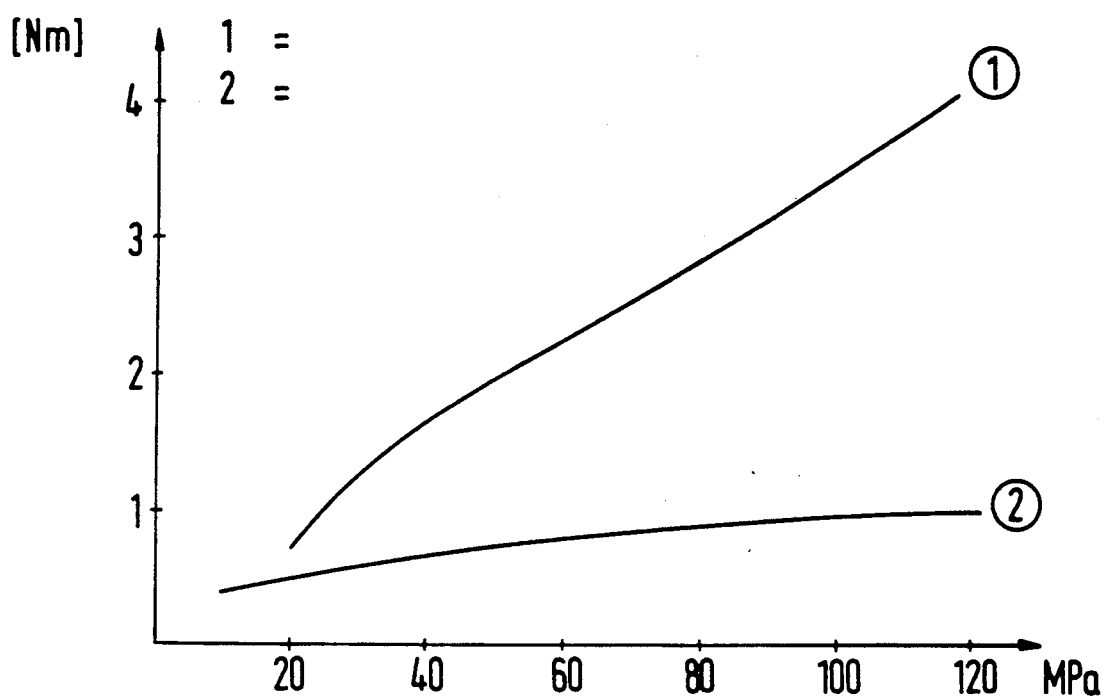
FIGS. 3 and 4 are graphs showing the differences between the present invention and the prior art during use.
Figure 4:
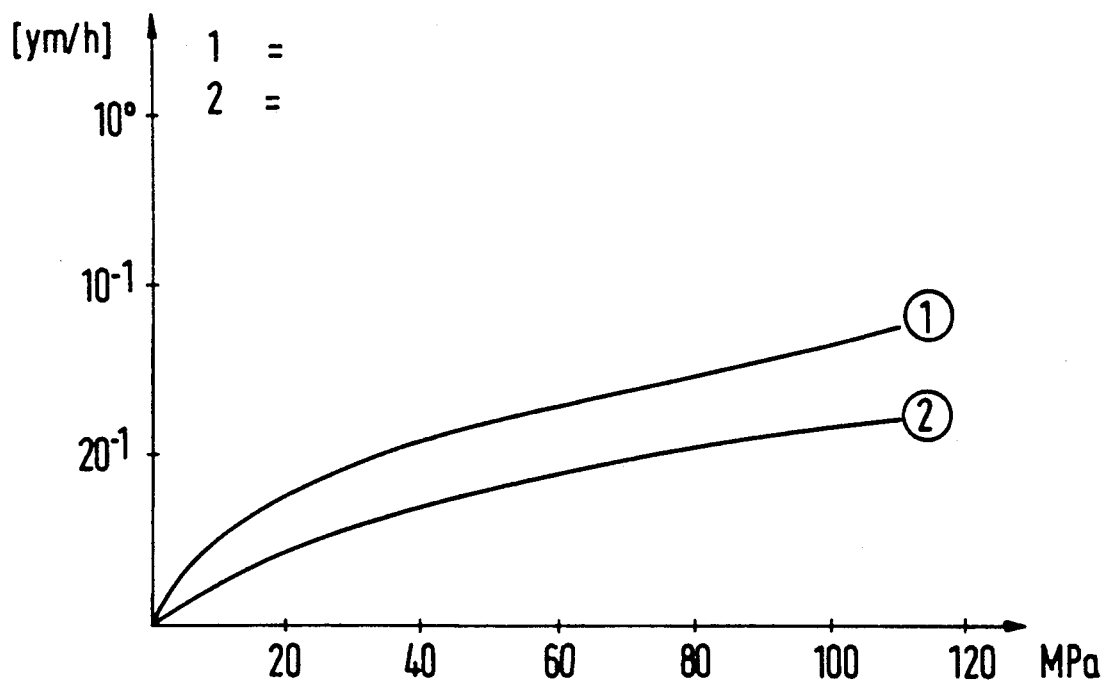

The test results are graphically represented in FIGS. 3 and 4 and indicate that the bearing bushings made from the composite bearing material in accordance with the invention are greatly superior to the bearing bushings made from the composite bearing material of the prior art as regards friction torque (Nm) and wear rate (μm/h) in dependence on the surface pressure (MPa).

What is claimed is:

1. A material for use in composite sliding surface bearings having a plastic sliding layer, which material comprises a metallic backing layer and a sliding layer, which is bonded to the backing layer and has a thickness of 30 to 500 μm and consists of a matrix-forming fluorine-containing polymer that contains a fine dispersion of 5 to 50% by weight metal powder having a high affinity to fluorine and a particle size of $\leq 40$ μm, wherein the fluorine-containing polymer has, in an X-ray diffractogram prepared by CuK α-radiation, a shaft intensity peak at a double Bragg angle of $2\theta = 18.07° \pm 0.03°$ and has a melting range of 320° to 350° C. and contains 5 to 30% by weight metal fluoride and 0.5 to 5.0% by weight metal oxyfluoride.

2. A material according to claim 1, wherein the metal powder consists of lead, tin, zinc, indium, thallium, cadmium, bismuth, barium, copper, silver or an alloy thereof, individually or in combination, and is dispersed in the fluorine-containing polymer.

3. A material according to claim 1, further comprising 1 to 20% by weight, finely dispersed powder particles which have a particle size of $\leq 40$ μm and consist of PTFE, $MoS_2$, graphite, ZnS, $BaSO_4$ and/or stearates.

4. A material according to claim 1, wherein the plastic sliding layer is directly bonded to a mechanically or chemically roughened surface of the backing layer.

5. A material according to claim 1, wherein the plastic sliding layer is joined to the backing layer via a porous interlayer, which has been sinter-bonded or sprayed onto the backing layer and consists of a metallic bearing material and the sliding layer material fills the pores and constitutes a covering layer.

6. A material according to claim 1, wherein the matrix contains 15 to 25% by weight lead fluoride, 1 to 3% by weight lead oxyfluoride and 30 to 40% by weight lead and optionally 5 to 15% by weight PTFE.

7. A material according to claim 1, wherein the matrix contains 59% by weight fluorine-containing polymer, 8% by weight lead, 24% by weight $PbF_2$, 1% by weight $PbOF_2$, and 8% by weight PTFE.

8. A material according to claim 1, wherein the matrix consists of 53% by weight fluorine-containing polymer, 8% by weight PTFE, 15% by weight $PbF_2$, 4% by weight $PbOF_2$, and 20% by weight lead.

9. A material according to claim 1, wherein the matrix consists of 43% by weight fluorine-containing polymer, 18% by weight PTFE, 15% by weight $PbF_2$, 4% by weight $PbOF_2$ and 20% by weight lead.

10. A material according to claim 1, wherein the polymer contains 15 to 25% by weight metal fluoride and 1 to 3% by weight metal oxyfluoride.

11. A material according to claim 1, further comprising 5 to 15% by weight, finely dispersed powder particles which have a particle size of $\leq 40$ μm and consist of PTFE, $MoS_2$, graphite, ZnS, $BaSO_4$ and/or stearates.

* * * * *